(12) United States Patent  
Ozdemir

(10) Patent No.: US 8,522,067 B2
(45) Date of Patent: Aug. 27, 2013

(54) VARIABLE LATENCY INTERFACE FOR READ/WRITE CHANNELS

(75) Inventor: Cecilia Ozdemir, Los Gatos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 357 days.

(21) Appl. No.: 12/925,253

(22) Filed: Oct. 15, 2010

(65) Prior Publication Data

US 2011/0314324 A1 Dec. 22, 2011

Related U.S. Application Data

(60) Provisional application No. 61/355,956, filed on Jun. 17, 2010.

(51) Int. Cl.
*G06F 1/04* (2006.01)
*G06F 1/12* (2006.01)
*G11B 5/09* (2006.01)

(52) U.S. Cl.
USPC ............... 713/600; 713/601; 360/39; 360/43; 360/51

(58) Field of Classification Search
USPC ................. 713/600, 601; 360/39, 43, 51
See application file for complete search history.

(56) References Cited

U.S. PATENT DOCUMENTS

| 8,023,217 | B1* | 9/2011 | Pinvidic et al. | 360/51 |
| 8,214,719 | B1* | 7/2012 | Sheng et al. | 714/763 |
| 2002/0021516 | A1* | 2/2002 | Burns et al. | 360/46 |
| 2004/0240095 | A1* | 12/2004 | Igari | 360/60 |
| 2005/0066119 | A1* | 3/2005 | Azimi | 711/112 |

\* cited by examiner

*Primary Examiner* — Vincent Tran
(74) *Attorney, Agent, or Firm* — Munck Wilson Mandala, LLP

(57) ABSTRACT

A variable latency interface and method for managing variable latency. An apparatus includes a storage device controller and a read/write channel coupled to the storage device controller by a variable latency interface. The variable latency interface includes a media control component configured for read and write operations. The variable latency interface also includes a data transfer component configured for read and write operations. A read or write operation in the media control component is offset from a respective read or write operation in the data transfer component by a latency period.

20 Claims, 15 Drawing Sheets

| Name | Clocked On | Direction | Description |
| --- | --- | --- | --- |
| XFRCLK_OUT | N/A | RWC OUT | Clock for data transfers (not gapped). Maui channel programmable frequencies: 1/16 - 1/14 - 1/12 - 1/10 (default) of RWC data rate. |
| XFRCLK_IN | N/A | RWC IN | Clock for data transfers. Derived from XFRCLK_OUT. |
| DCLK | N/A | RWC OUT | Clock for media transfers in HDC. Maui channel programmable frequencies: 1/2 - 1/3 - 1/4 (Default) - 1/5 1/8 of RWC servo rate. |

*FIG. 2A*

| Name | Clocked On | Direction | Description |
| --- | --- | --- | --- |
| ABORT_RWC | ASYNCH | RWC IN | Abort for read and write modes. This signal is kept high by the HDC till ABORT_DONE is asserted. |
| ABORT_DONE | ASYNCH | RWC OUT | This signal goes high when an abort operation from HDC has been received and executed by the RWC. It is deasserted by FW. |
| WRITE_MODE | ASYNCH | RWC IN | Puts RWC in Write mode if set, otherwise RWC is in read mode. Used for both media control and data transfer. Minimum duration 6 DCLK. |

*FIG. 2B*

| Name | Clocked On | Direction | Description |
|---|---|---|---|
| READY_FOR_GATE | ASYNCH | RWC OUT | Indicates RWC is ready for a Read or Write gate. |
| SEGMENT_SIZE[15:0] | ASYNCH | RWC IN | Size of a data field in two bits resolution per segment. Does not include PLOLEN, data sync mark or PAD. Must be generated one DCLK cycle before RG/WG and stay valid for the duration of the gate. Min. size 120 bits. |
| GATE_DELAY[5:0] | ASYNCH | RWC IN | RG or WG internal delay in RWC half rate data clock resolution to be added to the received gate from HDC. Must be generated one DCLK cycle before RG/WG and stay valid for the duration of the gate. |
| LBA[47:0] | ASYNCH | RWC IN | Logical Block Address for ECC support. Must be generated one clock before RG and stay valid for the duration of the gate in a read operation. Must be generated one DCLK cycle before FIRST_WRITE and stay valid till FIRST_WRITE is high in a write operation. |
| FIRST_SEG | ASYNCH | RWC IN | First segment of a sector. Must be generated one DCLK cycle before RG/WG and stay valid for the duration of the gate. |
| LAST_SEG | ASYNCH | RWC IN | Last segment of a sector. Must be generated one DCLK cycle before RG/WG and stay valid for the duration of the gate. |
| GATE_END | DCLK | RWC OUT | Tells HDC that internal RG or WG is concluded and RWC is ready for a new read operation. One clock cycle pulse per segment. |

*FIG. 2C*

| Name | Clocked On | Direction | Description |
|---|---|---|---|
| RG | ASYNCH | RWC IN | Read gate, min. pulse 6 DCLK cycles. |
| SPECULATIVE_RD | ASYNCH | RWC IN | If high RWC lower correction effort. Must be generated one clock cycle before RG and kept active for all the RG of the whole sector. |
| DATA_SMDB | ASYNCH | RWC OUT | Signal active low, it is deasserted as soon as RWC finds data sync mark and it is kept low till GATE_END goes high. |
| DATA_SYNC_MISSED | DCLK | RWC OUT | Tells HDC that sync mark was not found valid with GATE_END. One clock cycle pulse from per segment. |
| DATA_SYNC_WARN | ASYNCH | RWC OUT | Tells HDC that a problem occurred in RWC during the sync mark detection phase. Valid and stable when GATE_END is high for the actual fragment and the following ones prior its clearance. Log available in a channel register, each condition is maskable. This flag need to be cleared by FW. The register log details are in Fig. 4. |
| DATA_READ_WARN | ASYNCH | RWC OUT | Tells HDC that a problem occurred in RWC during the data equalization phase. Valid and stable when GATE_END is high for the actual fragment and the following ones prior its clearance. Log available in a channel register, each condition is maskable. This flag need to be cleared by FW. The register log details are in Fig. 4. |

*FIG. 2D*

| Name | Clocked On | Direction | Description |
|---|---|---|---|
| WG | ASYNCH | RWC IN | Write gate, min. pulse 6 DCLK cycles. |
| PLOLEN[7:0] | ASYNCH | RWC IN | Length of the PLO in number of preamble cycles. Does not include data sync mark, data or PAD. Minimum number of preamble cycle is 8. Must be generated one DCLK cycle before WG and stay valid for the duration of the gate. |

*FIG. 2E*

| Name | Clocked On | Direction | Description |
|---|---|---|---|
| WRITE_DATA[15:0] | XFRCLK_IN | RWC IN | HDC data out. |
| WRITE_DATA_PARITY | XFRCLK_IN | RWC IN | Odd data parity for data integrity check. One parity bit aligned with each WRITE_DATA 16 bits symbol. |
| WRITE_DATA_VALID | XFRCLK_IN | RWC IN | Aligned with WRITE_DATA, when high indicates if a symbols is valid. |
| WRITE_DATA_WAIT | XFRCLK_OUT | RWC OUT | RWC can only receive TBD symbols before a memory write path overflow. |
| FIRST_WRITE | XFRCLK_IN | RWC IN | HDC is sending first write symbol of a sector. |
| LAST_WRITE | XFRCLK_IN | RWC IN | HDC is sending last write symbol of a sector. |

*FIG. 2F*

| Name | Clocked On | Direction | Description |
|---|---|---|---|
| READ_DATA[15:0] | XFRCLK_OUT | RWC OUT | RWC data out. |
| READ_DATA_PARITY | XFRCLK_OUT | RWC OUT | Odd data parity for data integrity check. One parity bit aligned with each READ_DATA 16 bits symbol. |
| READ_DATA_VALID | XFRCLK_OUT | RWC OUT | Aligned with READ_DATA, when high indicates if a symbols is valid. |
| READ_DATA_WAIT | XFRCLK_IN | RWC IN | HDC can only receive TBD symbols before a memory overflow. |
| FIRST_READ | XFRCLK_OUT | RWC OUT | RWC is sending first read symbol of a sector. |
| LAST_READ | XFRCLK_OUT | RWC OUT | RWC is sending last read symbol of a sector. |
| CW_END | XFRCLK_OUT | RWC OUT | RWC is sending last read symbol of a codeword. |
| DATA_ERR[3:0] | XFRCLK_OUT | RWC OUT | Errors of the ECC codeword: Bit[0] = High if uncorrectable codeword Bit[1] = High if LBA mismatch Bit[2] = High if EDC failure Bit[3] = High if SECC memory overflow. Valid when CW_END is high. |
| DATA_INFO[17:0] | XFRCLK_OUT | RWC OUT | Information on the data of the ECC codeword: Bit[0] = High if a TA occurred in the codeword Bit[7:1] = Number of corrected symbols Bit[17:8] = Number of SECC iterations. Valid when CW_END is high. |

*FIG. 2G*

| VLI fault | Name | Register | Description |
|---|---|---|---|
| SYNC_WARN | SCS_ITR_SMD_ST1_MISS | | Read First STAM missed: The first STAM in dual sync mode has been lost by the Sync Mark Detector. |
| | SCS_ITR_SMD_ST12ST2_ERR | | Read DualSTAM distance error: The distance between the first STAM and the second one is different with respect to the programmed value during a read operation. |
| | SCS_ITR_STAM_ST1_MISS | | Read STAM1 missed: First STAM not found inside the search window during a read operation. |
| | SCS_ITR_STAM_ST2_MISS | | Read STAM2 missed: Second STAM not found inside the search window during a read operation. |
| | SCS_ITR_STAM_LOL | | Read Loss Of Lock: First STAM detected but subsequent stream qualification failed. |
| READ_WARN | SCS_PGR_OVER_THR | | Read Dual Gain Restart over threshold: The second gain correction estimated by the Phase and Gain Restart during a read operation exceeds the programmed threshold. |
| | SCS_ITR_EB_OVRUN | | Read EB over run: The Elastic Buffer was unable to store all the samples coming from the media (full EB). |
| | SCS_ITR_EB_EOVRUN | | Read EB early over run: The EB is already full and new samples are arriving. |
| | SCS_ITR_EB_UNRUN | | Read EB under run: The Elastic Buffer was unable to provide samples to the detector (empty EB). |
| | SCS_FIFO_DATA_LOST | | Read EB data lost: Read EB lost the fragment tail. |
| | SCS_DATA_FLUSH_ABORT | | Data Flush Abort: The equalized samples stream to detector is aborted. |
| | SCS_DFS_VGAR_DEFECT | | Read gain (amplitude) detect: Read gain (amplitude) defect. |

*FIG. 4*

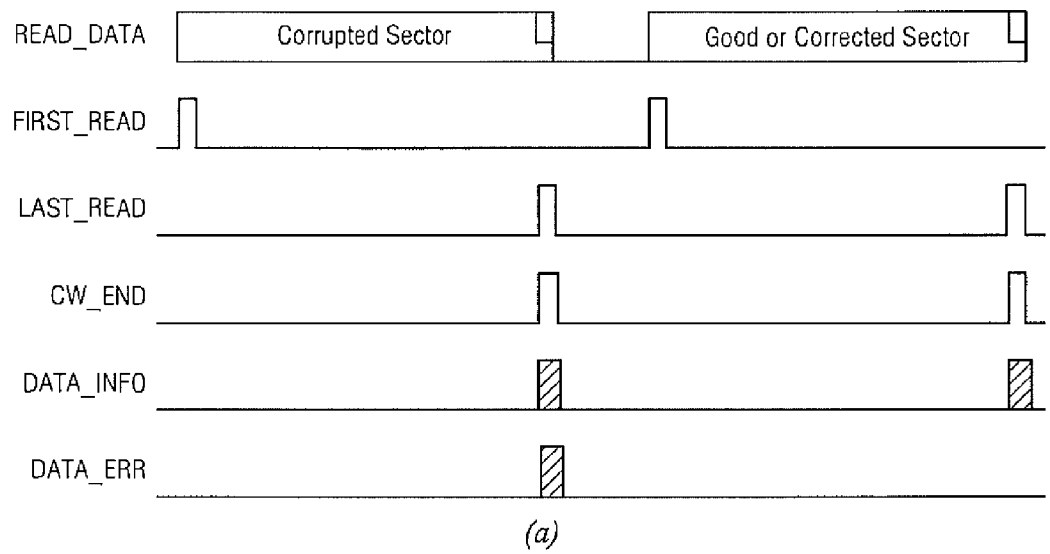
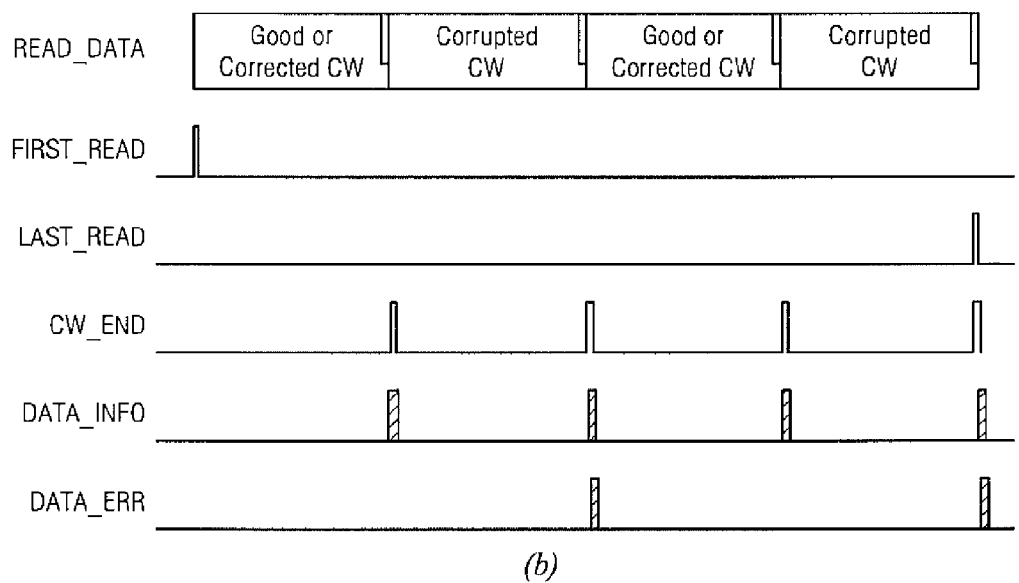
*FIG. 13*

VARIABLE LATENCY INTERFACE FOR READ/WRITE CHANNELS

CROSS-REFERENCE TO RELATED APPLICATION(S) AND CLAIM OF PRIORITY

The present application is related to U.S. Provisional Patent Application No. 61/355,956, filed Jun. 17, 2010, entitled "VARIABLE LATENCY INTERFACE FOR READ/WRITE CHANNELS". Provisional Patent Application No. 61/355,956 is assigned to the assignee of the present application and is hereby incorporated by reference into the present application as if fully set forth herein. The present application hereby claims priority under 35 U.S.C. §119(e) to U.S. Provisional Patent Application No. 61/355,956.

TECHNICAL FIELD

The present disclosure is directed, in general, to data storage interfaces, and more specifically, to a variable latency interface for read and write channels for a data storage device.

BACKGROUND

In a conventional interface between a read/write channel (RWC) and a storage device controller, such as a hard disk controller (HDC), the read and write operations are typically controlled by the HDC. However, in systems with data encryption, the data is encoded before writing to the HDC or decoded after reading from the HDC. The encoding and decoding steps may introduce significant latency into the RWC. Due to the potentially long latency periods introduced into the channel, the read and write media controls from the HDC cannot be aligned with data transferred from and to the RWC.

SUMMARY

An apparatus is provided that includes a storage device controller and a read/write channel coupled to the storage device controller by a variable latency interface. The variable latency interface includes a media control component configured for read and write operations. The variable latency interface also includes a data transfer component configured for read and write operations. A read or write operation in the media control component is offset from a respective read or write operation in the data transfer component by a latency period.

A method for managing variable latency in an interface is provided. The interface couples a read/write channel to a storage device controller. The method includes performing a read operation in a media control component of the interface. The method also includes performing a read operation in a data transfer component of the interface. A start of the read operation in the media control component is offset from a start of the read operation in the data transfer component by a latency period.

Another method for managing variable latency in an interface is provided. The interface couples a read/write channel to a storage device controller. The method includes performing a write operation in a media control component of the interface. The method also includes performing a write operation in a data transfer component of the interface. A start of the write operation in the media control component is offset from a start of the write operation in the data transfer component by a latency period.

Other technical features may be readily apparent to one skilled in the art from the following figures, descriptions and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A-2G illustrate tables describing signals used by a VLI interface according to one embodiment;

FIG. 4 describes sync and read warnings used in VLI interface 100, according to one embodiment;

FIG. 13 illustrates data error handling operations according to embodiments of the present disclosure.

DETAILED DESCRIPTION

Figure 1:
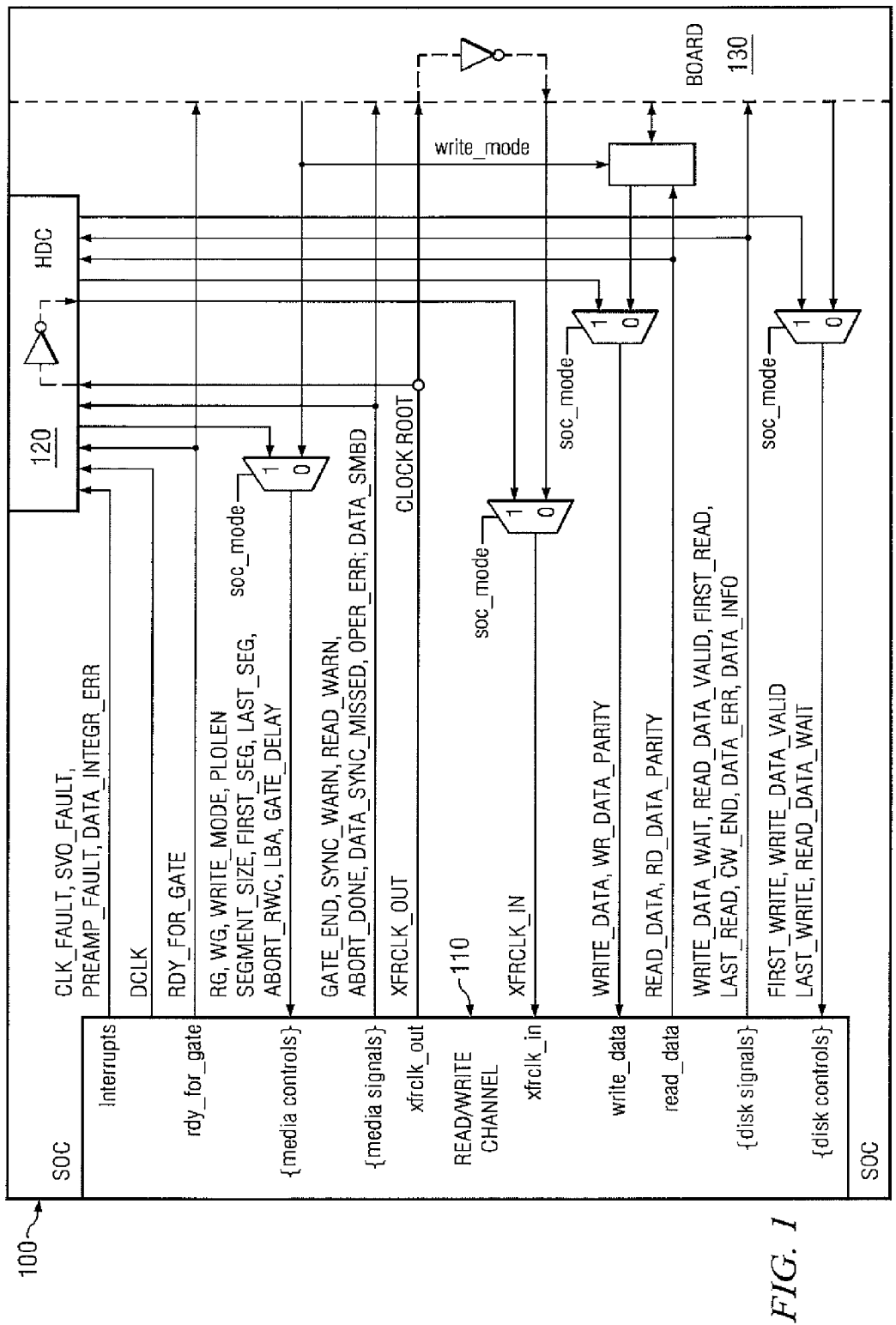
FIG. 1 depicts illustrates a variable latency interface (VLI) according to one embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged transmission medium.

This disclosure describes an interface between a read/write channel (RWC) with a variable latency and a storage device controller, such as a hard disk controller (HDC). The variable latency interface (VLI) disclosed herein solves many of the problems found in conventional interfaces for read/write channels. The disclosed variable latency interface manages the latency between the data transfer and the media commands for the communication of read and write channels with a storage device controller (e.g., a hard disk controller) for any read or write operation.

The following is a list of definitions and abbreviations that are used throughout this disclosure:

| Acronym or term | Definition |
| --- | --- |
| AFE | Analog front end (of RWC) |
| CW | Code word |
| Channel data rate | Data PLL frequency range |
| Channel servo rate | Servo PLL frequency range |
| ECC | Error correction code |
| FIFO | First-in, first-out |
| FW | Firmware |
| HDC | Hard disk controller |
| IP | Intellectual property |
| LBA | Logic Block Address |
| LOC | Loss of Clock |
| LOL | Loss of Lock |
| LSB | Least significant bit |
| MSB | Most significant bit |
| PLO | Preamble |
| PLOLEN | PLO field length |
| RG | Read gate |
| RWC | Read/write channel |
| DCLK | Disk locked clock |
| Sector | A collection of one or more segments |
| Segment | A piece of a sector. Servo wedges are inserted between segments Each segment consists of a PLO field, a data sync mark, data, and padding |
| SOC | System on a chip (HDC + RWC) |
| SSW | Self servo write |
| Symbol | A 16-bit quantity |
| VLI | Variable latency interface |
| WG | Write gate |

Because of the potentially long latency periods introduced by encoding (encryption) into the RWC, read and write media control operations to and from the HDC cannot be aligned with data transferred from and to the RWC, respectively. To support this long latency, the interface to the HDC may be modified as disclosed herein. There are two sides to the interface, a media side and a data transfer side. The two sides are essentially independent. There is no fixed temporal relationship between the two; each side is controlled by its own clock or clocks. On the media side, the HDC tells the RWC when to start writing or locking to the PLO field (reading). The HDC also tells the RWC when splits are to occur. Data is transferred on the data transfer side when it is ready, independent of the media side.

The variable latency interface of the present disclosure may be divided into two essentially independent components: a media control component and a data transfer component. The media control component, which may be referred to as VLI MEDIA, is associated with control data transfers from the RWC to the media, and from the media to the RWC. The data transfer component, which may be referred to as VLI DATA, is associated with data transfers from the RWC to the HDC, and from the HDC to the RWC.

FIG. 1 illustrates a VLI interface according to one embodiment of the present disclosure. VLI interface 100 provides a connection between a read/write channel (RWC) 110 and a hard disk controller (HDC) 120. VLI interface 100 also links to an external validation board 130. VLI interface 100 includes a number of signals between RWC 110 and HDC 120. These signals are described in greater detail in the tables shown in FIGS. 2A-2H.

The table in FIG. 2A describes clock signals that are used by VLI interface 100. The table in FIG. 2B describes miscellaneous signals that are used by VLI interface 100. These signals include ABORT_RWC and ABORT_DONE, which are associated with read and write operation aborts; and WRITE_MODE. The table in FIG. 2C describes the common signals used in media control operations. The tables in FIGS. 2D and 2E describe media control signals specifically for read and write operations, respectively. The tables in FIGS. 2F and 2G describe write and read data transfer signals, respectively. The use of these signals in VLI interface 100 is described in greater detail below.

A separate data sync mark found signal (DATA_SMBD) is sent by RWC 110 as soon as the sync mark is found. HDC 120 receives other data information from RWC 110 when the internal read gate is finished. The stop condition (the determination of whether a sector or a piece of a sector needs more time during reads) is calculated within RWC 110.

Before a write occurs, RWC 110 must be primed, since there may be a considerable latency in RWC 110. This priming happens before the write gate. If the write gate arrives, but RWC 110 is not sufficiently primed, an error occurs and the write is not initiated.

For both reads and writes, HDC 120 tells RWC 110 how many bits (segment size) should be read or written after the PLO field. The sector size is contained in a register in RWC 110. The sector size reflects the total number of data symbols exchanged between HDC 120 and RWC 110. For writes only, HDC 120 tells RWC 110 when to write the data PLO and how long it is. Padding is added after the data, and its size is contained in a register in RWC 110. To increase resolution in the starting of the read and write operations, the external gates (WG or RG) are delayed internally by RWC 110 by a number of half-rate clock cycles indicated by HDC 120 with the GATE_DELAY bus.

LBA information is used by RWC 110 during encoding and decoding of the data. For a write operation, LBA information is transferred to RWC 110 along with the data block. The LBA information is generated a clock cycle before FIRST_WRITE, and is valid until FIRST_WRITE is de-asserted. For a read operation, the LBA information to RWC 110 needs to be generated one clock cycle before RG. The LBA information is kept valid for the duration of the read gate of the first fragment.

In addition, during reads, a method is provided for sending sectors to HDC 120 before they are known to pass the stop condition. The sectors and/or codewords can be invalidated or confirmed as valid by RWC 110 while being sent.

VLI interface 100 is also used to perform SSW (Self Servo Write) operations. In a SSW mode of operation, data is arranged in words of 16 bits and is transferred to RWC 110 through the disk interface write data port following a standard read handshake. HDC 120 is responsible for making data available to RWC 110 when requested.

In certain embodiments, the depth of the FIFO buffer in RWC 110 is 32 16-bit symbols. However, buffers of other sizes are possible.

Clocking Requirements

The clocking specifications for VLI interface 100 are as follows.

In one embodiment, the VLI synchronous signals must meet setup and hold times relative to the rising edge of their respective clock. The control signals and gates on this interface may be the outputs of flip-flops.

The source clocks (half-rate clock, DCLK, XFRCLK_OUT) used in VLI operation are generated by RWC 110. The XFRCLK_IN clock is derived from the XFRCLK_OUT clock from HDC 120. For VLI DISK, the data transfer operation is controlled by the XFRCLK_OUT clock (RWC 110 to HDC 120) and the XFRCLK_IN clock (HDC 120 to RWC 110). The transfer clocking for VLI MEDIA is as follows. In HDC 120, media operation is fully controlled by DCLK. In RWC 110, media operation is controlled by a half-rate or quarter-rate channel clock and only the generation of the GATE_END and DATA_SYNC_MISSED signals is done on DCLK domain.

VLI media signals to RWC 110 are clocked in with the positive edge of the DCLK clock, while RWC 110 media output signals are clocked out with the positive edge of the half-rate channel clock. Two exceptions are the DATA_SYNC_MISSED and GATE_END signals; because they are pulses, they are therefore generated with the negative edge of DCLK.

The media signals from RWC 110 to HDC 120 and from HDC 120 to RWC 110 are considered asynchronous, with the exception of GATE_END, DATA_SYNC_MISSED. When a signal is specified as asynchronous in this disclosure, this means that the launching clock is different with respect to the receiving clock. Accordingly, the signal needs to be resynchronized in the receiving domain.

When a signal is specified as stable under another signal, it means that the signal needs to be generated before the other signal is generated. For example, SEG_SIZE needs to be stable under WG. The SEG_SIZE bus needs to be generated before the rising edge of the clock that generates WG and remain stable until WG is de-asserted. If both WG and SEG_SIZE are generated by HDC 120 with DCLK on the same clock cycle, a channel that resynchronizes them with a much faster clock could latch a wrong command and in some cases even issue a fault.

Disk data operation is controlled by the XFRCLK_OUT and XFRCLK_IN clocks. XFRCLK_OUT is a continuous clock and is not gapped. It may be zone-based or it may be held at a maximum frequency. In any case, its frequency is greater than or equal 1/16 of the channel full rate clock for bandwidth reasons. In certain embodiments, the XFRCLK_OUT frequency is programmable to be 1/16, 1/14, 1/12 or 1/10 of the channel full rate clock.

VLI disk transfer signals to RWC 110 are clocked in with the positive edge of the XFRCLK_IN clock, while RWC 110 disk output signals are clocked out with the negative edge of the XFRCLK_OUT clock. The XFRCLK_OUT and XFRCLK_IN clocks are considered to be out of phase. The RWC half/quarter rate clock, DCLK, XFRCLK_OUT, and XFRCLK_IN clock domains are handled as if they are asynchronous to each other. The XFRCLK_OUT clock is inverted before it is transmitted out in order to have data capture and data generation on different clock edges.

A clock fault is passed to HDC 120 in case of a loss of lock or a loss of clock of either one of the RWC phase lock loops (PLLs). The loss of clock condition does not occur if the clock is switched off with a legal firmware operation for power saving. In the case of a RWC 110 reset, the clock fault is raised.

Data Alignment

Figure 3:
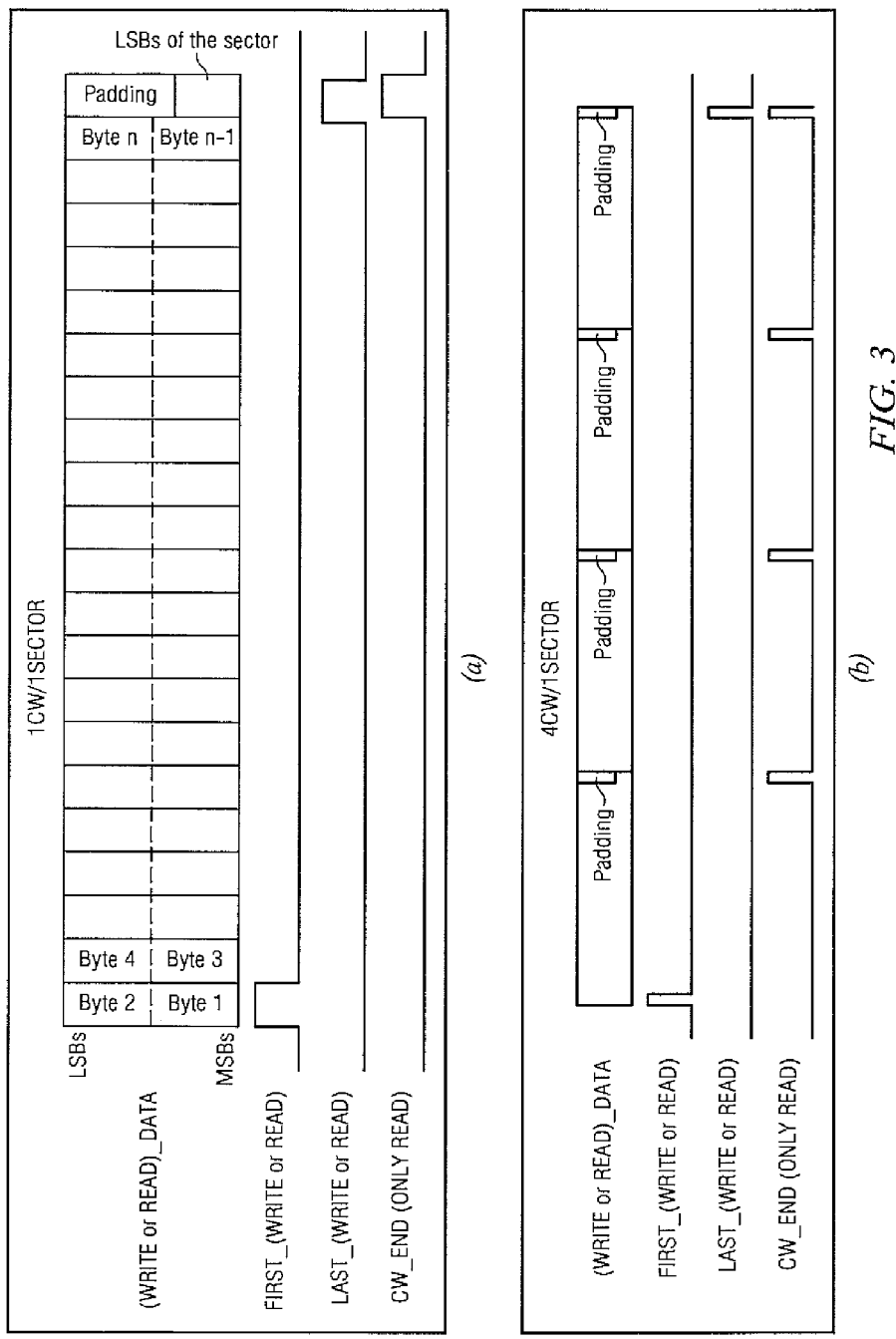
FIG. 3 illustrates data alignment and padding in a code word and sector, according to one embodiment.

FIG. 3 illustrates data alignment and padding in a code word and sector, according to embodiments of the present disclosure. In FIG. 3(a), there is one code word for each sector. In FIG. 3(b), each sector includes four code words. Data on READ_DATA and WRITE_DATA buses are left-to-right aligned (MSB first). As shown in FIG. 3, any padding at the code word and/or sector boundary is placed at the LSBs of the last data word. In some embodiments, there is no padding across VLI interface 100 because data from HDC 120 are multiples of 16 bits.

Sector Latency

In certain embodiments, a single sector in the read path could have the following latency due to SECC/LDPC correction:

| Sector latency | Min. (sectors) | Max (sectors) |
|---|---|---|
| 512 byte | 2.3 | 21 |
| 4 KB | 1.3 | 16 |

Of course, these latency values are just one example. It is contemplated that other embodiments having other values are possible. The maximum number of sectors in the read pipeline is 32 sectors for 512-byte latency and 4 sectors for 4 KB latency.

During a read operation, if the read pipeline is full and cannot accept a new sector, the READY_FOR_GATE signal is lowered by RWC 110.

In a write operation, a sector's worth of data needs to be provided by HDC 120 through VLI interface 100 before RWC 110 asserts READY_FOR_GATE and could accept a WG.

Data Warnings

FIG. 4 describes sync and read warnings used in VLI interface 100, according to embodiments of the present disclosure. The SYNC_WARN and READ_WARN signals go high when a problem occurs during the sync mark detection or data equalization phases. The tables depicted in FIG. 4 describe the details of the register log.

Signal Synchronization

Figure 5:
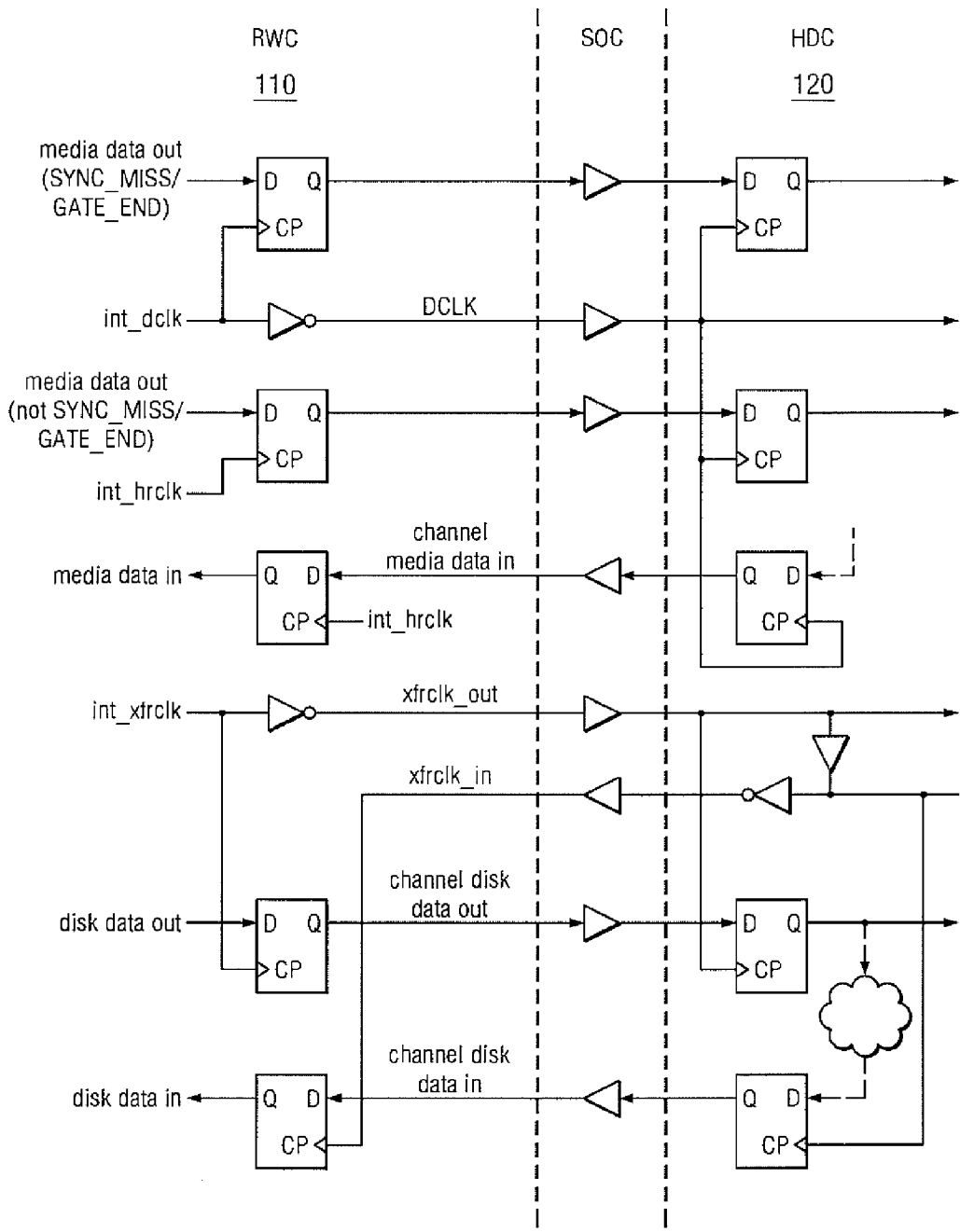
FIG. 5 illustrates examples of clock domains and data flow relationships in a channel standalone mode according to one embodiment.

FIG. 5 illustrates examples of clock domains and data flow relationships in a channel standalone mode according to one embodiment. VLI interface 100 is designed for flexibility in clock synchronization (e.g., synchronization between the XFER_CLK and the buffer clock in HDC 120).

HDC 120 can sample any media signal from RWC 110 by using the rising edge of DCLK from RWC 110. Upon detection of the RDY_FOR_GATE signal by RWC 110, media control data can be transmitted to RWC 110. The media control inputs to RWC 110 are levels; they are launched on the positive edge of DCLK before the gate. RWC 110 captures the media control inputs on the rising edge of the internal data half-rate or quarter-rate clock after detecting the gate.

In certain embodiments, the media transfer (with the exception of DATA_SYNC_MISS and GATE_END) is considered asynchronous.

Write Media Control

Figure 6:
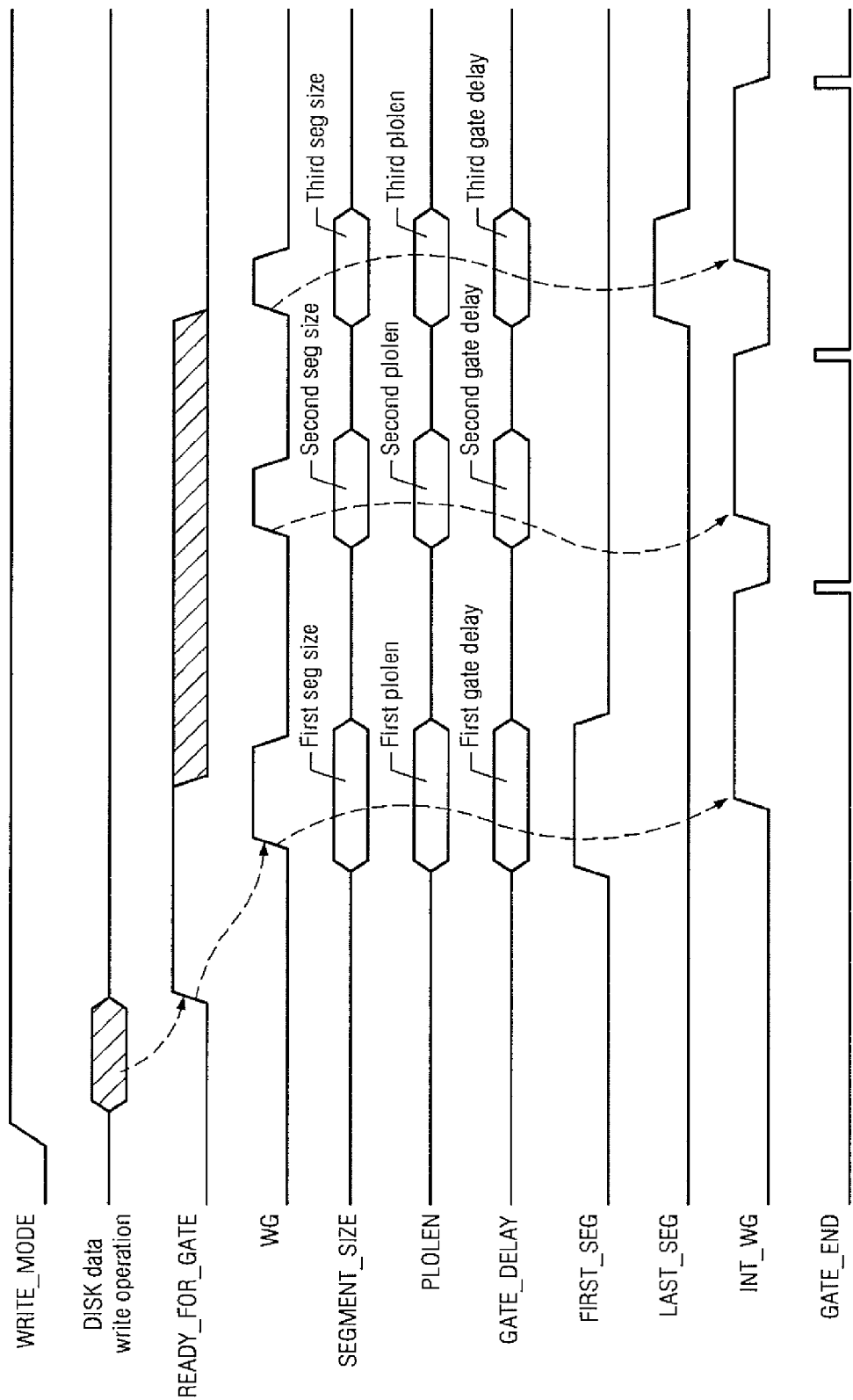
FIG. 6 illustrates a write media control operation according to one embodiment.

FIG. 6 illustrates a write media control operation, according to one embodiment of the present disclosure. WRITE_MODE is asserted by HDC 120 for both data transfer and media control in order for the write to take place. WRITE_MODE remains asserted by HDC 120 in order for RWC 110 to enter into write mode. Upon WRITE_MODE de-assertion, internal channel write path buffers are cleared. The writing of PLO information starts when the internal WG signal (INT_

WG) goes high after being delayed from the rising edge of WG by the amount specified by GATE_DELAY (number of pairs of half or quarter rate) at the beginning of each segment. These delays are indicated in FIG. 6 by the dashed lines. The duration of WG does not affect the operation of RWC 110. RWC 110 ignores the falling edge of WG and extends INT_WG to cover the postamble padding.

The PLOLEN, GATE_DELAY and SEGMENT_SIZE parameters are generated one DCLK cycle before WG is asserted and stay valid for the duration of the gate. PLOLEN represents the number of preamble cycles (4 bits each) that HDC 120 counts to write on the disk. SEGMENT_SIZE represents the number of pairs of bits to be written on the disk for each fragment.

SECTOR_SIZE is a RWC register that remains constant for a given operation. It represents the number of unencoded bits of data in a sector. The sum of all segment sizes is equal to the SECTOR_SIZE value plus the extra bits added during encoding. Pad size is also a register in RWC 110 that represents the number of pad symbols that is to be written.

The RDY_FOR_GATE signal goes low whenever RWC 110 is in write mode (i.e., WRITE_MODE is set) and the write channel is not primed (i.e., less than a sector worth of data loaded in the write channel). HDC 120 checks the state of RDY_FOR_GATE near the end of the current sector before asserting WG for the next sector. If RDY_FOR_GATE is low, then HDC 120 either aborts the next write or slips a revolution. If RDY_FOR_GATE is de-asserted before the middle of the last segment, the write operation for the current sector should be completed. Once a sector write starts, all remaining segments are written regardless of the state of RDY_FOR_GATE. For example, RDY_FOR_GATE could go low anytime after the first segment of the current sector. However, HDC 120 ignores the de-asserted RDY_FOR_GATE signal and continues asserting WG for the remaining segments of this sector.

The FIRST_SEG signal is asserted one DCLK cycle before WG is asserted for the first segment. FIRST_SEG remains asserted for the entire duration of the asserted WG. The LAST_SEG signal is asserted before WG is asserted for the last segment, and it remains valid for the entire duration of the asserted WG. If the sector consists of only one segment, then both FIRST_SEG and LAST_SEG are asserted. These signals are used by RWC 110 to monitor the flow of segments relative to a given sector and to identify the start and the end of a sector.

In sector mode, FIRST_SEG and LAST_SEG are used to frame a sector correctly. RWC 110 issues an OPER_ERR indicator if FIRST_SEG and LAST_SEG are not issued correctly for example if a LAST_SEG arrives before a FIRST_SEG).

In fragment mode, the data can have any length and the SECTOR_SIZE register content is ignored by the RWC 110; FIRST_SEG and LAST_SEG in this case are both set high since each fragment is unique.

The end of each asserted WG signal is flagged by RWC 110 with a one DCLK pulse GATE_END signal once INT_WG is finished and RWC 110 is ready for a new WG. WG is low during servo wedges and between segments. As discussed earlier, FIGS. 2C and 2E provide additional information about the write media control signals.

Read Media Control

Figure 7:
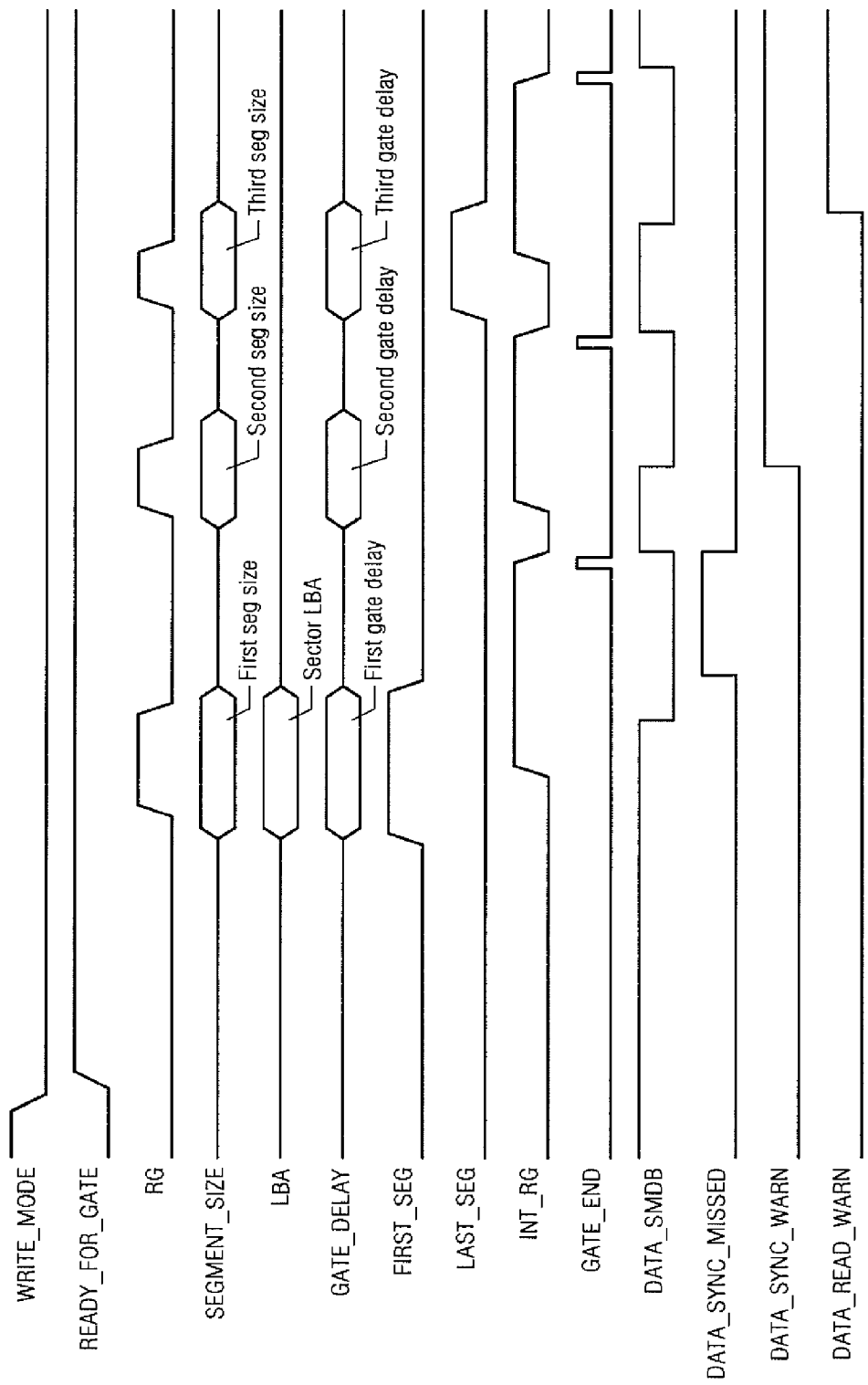
FIG. 7 illustrates a read media control operation according to one embodiment.

FIG. 7 illustrates a read media control operation, according to one embodiment of the present disclosure. During read mode, WRITE_MODE is de-asserted by HDC 120. As soon as RWC 110 recognizes the read mode, RDY_FOR_GATE is asserted; there is no need for data priming first. RDY_FOR_GATE could be de-asserted during the normal operation when the memory of the data read path is full and RWC 110 cannot accept more data from the disk.

In one aspect of operation, HDC 120 raises the RG signal and RWC 110 generates an internal RG signal (INT_RG), thereby delaying the external gate by the number of data half-rate clock cycles specified in the GATE_DELAY bus. The INT_RG signal rises during the PLO field. RWC 110 does not use as a reference the end of the external RG because RWC 110 is aware of the sync mark detection and the segment size. The end of INT_RG is calculated by RWC 110 and it is flagged to HDC 120 with a one DCLK pulse GATE_END signal once INT_RG is finished and RWC 110 is ready for a new RG. RG is low during servo wedges and between segments. The DATA_SMDB signal is default high, and it is de-asserted when the sync mark is found and is kept low until the de-assertion of GATE_END.

GATE_END is used also to validate the media data information transfer from RWC 110 when DATA_SYNC_MISSED, DATA_SYNC_WARN, and DATA_READ_WARN are asserted. Thus, HDC 120 knows at the end of each segment if RWC 110 encountered any issue during the signal equalization or SM detection phases. While DATA_SYN_MISSED is new for each segment, DATA_SYNC_WARN and DATA_READ_WARN, once asserted, stay high for any following segments until they are cleared by the firmware. These flags, when asserted, do not prevent the return of the read data to HDC 120.

SEGMENT_SIZE is generated one DCLK cycle before RG and is valid for the duration of the gate. It represents the number of data fields in the segment with two bits resolution, not including PLO, data sync mark, or pad.

FIRST_SEG and LAST_SEG are generated one DCLK cycle before RG is asserted for the first and the last segment, respectively, and remain valid for the entire duration of the asserted RG. If the sector consists of only one segment, then both FIRST_SEG and LAST_SEG are asserted. These signals are used by RWC 110 to monitor the flow of segments relative to a given sector and to identify the start and end of a sector.

HDC 120 transfers the LBA information to be used in the ECC decoding through the LBA bus. In a read operation, the LBA signal is asserted one DCLK cycle before RG and stays valid for the length of the gate of the first segment of the sector. The LBA value is different and not sequential for each sector. Therefore, it is reloaded once per sector by HDC 120.

The LBA field is extended in RWC 110 by two LSBs. In embodiments with 512-byte sectors, these two LSBs are kept to zero. Therefore, the LBA used by the ECC for each sector is {LBA,00}. In embodiments having 4K sectors, RWC 110 increments the LBA value internally for each code word. Thus, the LBA used by the ECC for each sector is:

CW1={LBA,00}, CW2={LBA,01}, CW3={LBA,10}, CW4={LBA,11}.

Figure 8:
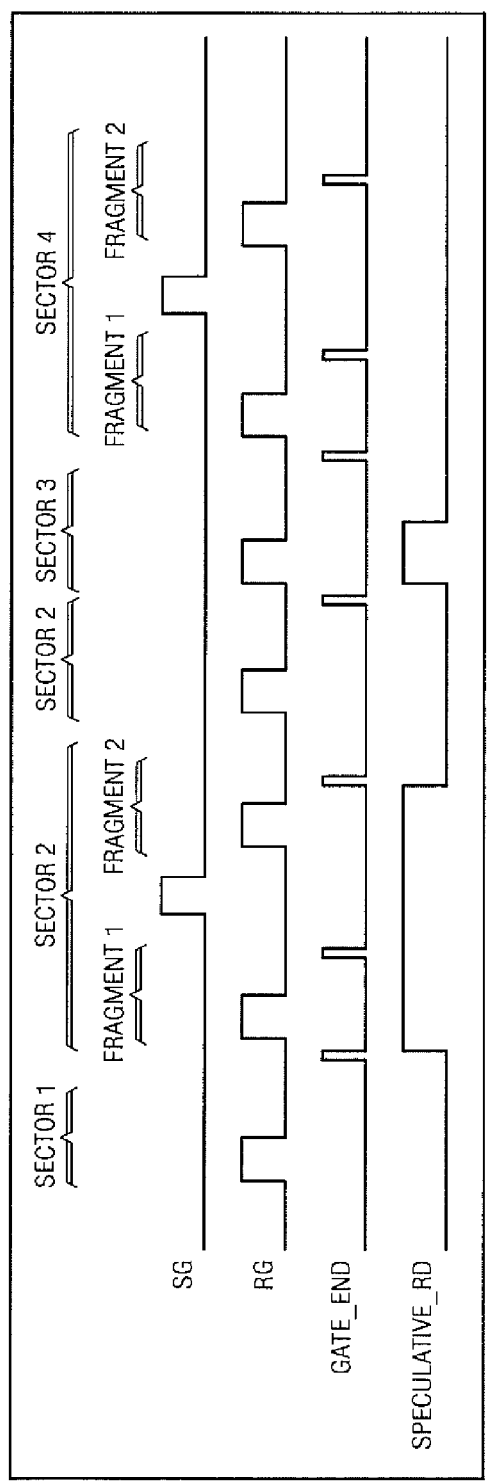
FIG. 8 illustrates a speculative read control operation according to one embodiment.

FIG. 8 illustrates a speculative read control operation according to one embodiment. If the SPECULATIVE_RD signal is asserted, HDC 120 places RWC 110 in minimum read effort so that resources will not be filled and the latency is reduced. HDC 120 should not release a sector to the host if it has ECC uncorrectable errors, but should not stop the pipeline flow. In this situation, SPECULATIVE_RD is asserted over the whole duration of RG and across the whole sector during media control.

As discussed earlier, FIGS. 2C and 2D provide additional information about the read media control signals.

Write Data Transfer

Figure 9:
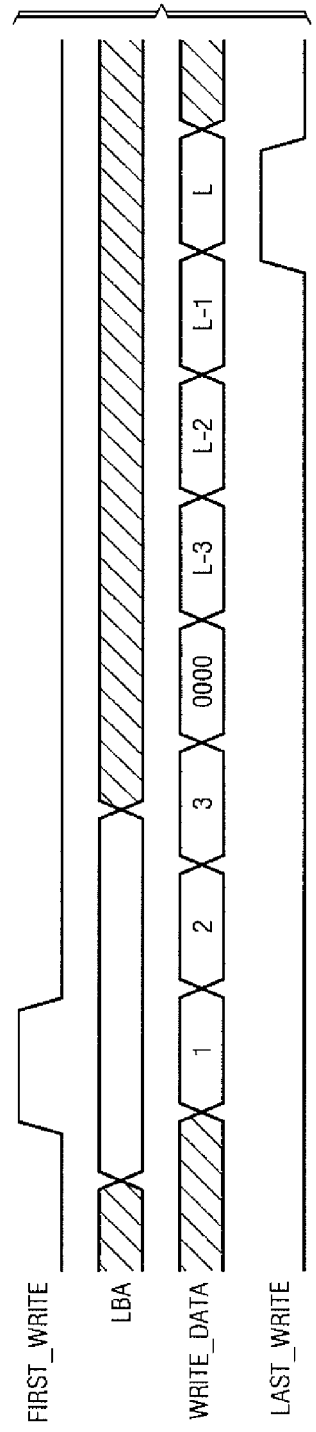
FIG. 9 illustrates a sector write data transfer operation according to one embodiment.

FIG. 9 illustrates a sector write data transfer operation according to one embodiment. Write mode is entered by asserting the WRITE_MODE signal over VLI interface 100. WRITE_MODE remains asserted until all write data is transferred and written on the disk. WRITE_MODE remains set or can be turned on during servo reads so that the data transfer can take place. In certain embodiments, there is no association between servo reads and WRITE_MODE.

To start a transfer, the write channel is first initialized by configuring the write channel with the proper programmable registers. After initialization of the write channel, the data transfer can take place. Priming of the first sector commences when HDC 120 raises WRITE_DATA_VALID for the first time. WRITE_DATA contains the first symbol during the first cycle of WRITE_DATA_VALID. Priming is not necessary between sectors because a pre-fetching operation continuously pulls in data for the next sector during the current sector.

Data transferred from HDC 120 is grouped in sectors; the code words boundaries are determined by the RWC 110.

The first symbol of write data transferred in any sector is accompanied by a FIRST_WRITE signal from HDC 120. FIRST_WRITE goes high at the same time that WRITE_DATA_VALID goes high, and goes low after the first symbol transfer occurs. FIRST_WRITE is one cycle long if the first symbol is transferred right before the second symbol, but can be extended until the first symbol is actually transferred.

The last symbol of data in any sector is accompanied by a LAST_WRITE signal from HDC 120. LAST_WRITE goes high after the second-to-last symbol is transferred. It goes low after the last symbol is transferred. LAST_WRITE is one cycle long if the last symbol is transferred right after the second-to-last symbol, but can be extended until the last symbol is actually transferred.

HDC 120 transfers the LBA information to be used in the ECC encoding through the LBA bus. In a write operation, the LBA signal is asserted when FIRST_WRITE is issued. The LBA value is issued once per sector by HDC 120. If a sector has multiple code words within a sector, RWC 110 increments the LBA value internally for each code word.

Figure 10:
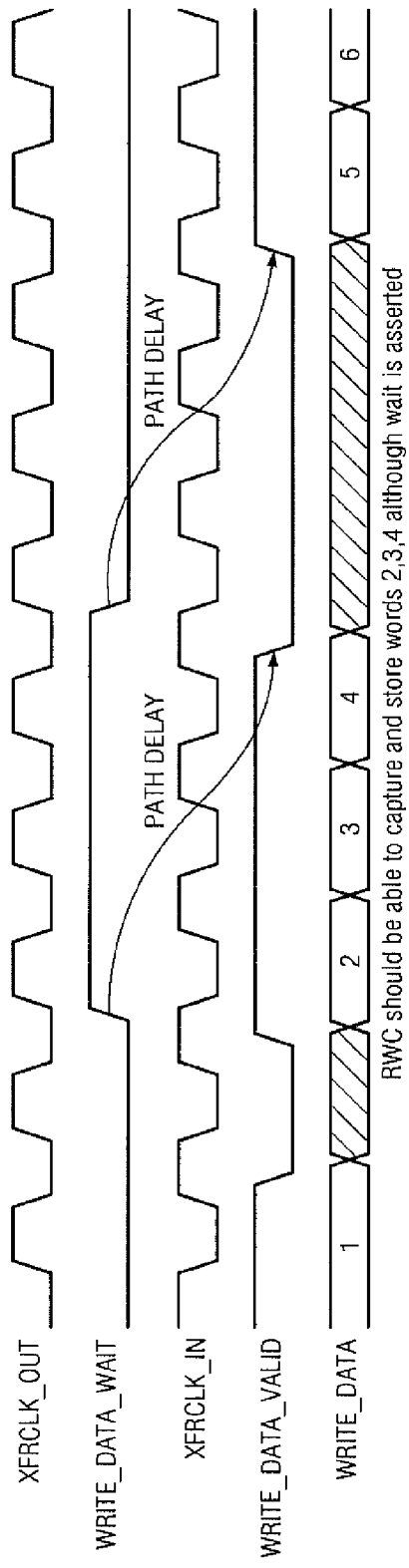
FIG. 10 illustrates a write data transfer operation according to one embodiment.

FIG. 10 illustrates a write data transfer operation according to one embodiment. Only WRITE_DATA_VALID is used to capture the write data in RWC 110. At any time during a write transfer, RWC 110 may stall the transfer by raising WRITE_DATA_WAIT. In response, the external controller de-asserts WRITE_DATA_VALID until WRITE_DATA_WAIT signal is cleared. RWC 110 continues to accept data while WRITE_DATA_WAIT is still active, but latency from WRITE_DATA_WAIT assertion to WRITE_DATA_VALID de-assertion should be within the limits of 8 XFRCLK_IN clock cycles in order to not overflow the RWC internal buffers. RWC 110 de-asserts WRITE_DATA_WAIT when the wait condition is cleared. RWC 110 continues writing data to the media during these pauses. The external controller may pause at any time by dropping WRITE_DATA_VALID. It produces the next symbol at the same time when WRITE_DATA_VALID once again goes high.

The amount of data to be transferred per sector over the WRITE_DATA bus is equal to SECTOR_SIZE. If the SECTOR_SIZE and/or the code word size is not a multiple of 16 bits, then HDC 120 pads the last word of the sector/code word. The WRITE_DATA bus is left aligned. Padding bits, if any, are placed at the LSBs of the word. RWC 110 removes the padding bits from the code word/sector data before writing the data to the media (the number of pad bits is indicated by a register in RWC 110).

In one aspect of operation, HDC 120 maintains a minimum average bandwidth. If RWC 110 is requested to write another data symbol, but it does not have one to write (e.g., due to a starvation condition), it flags an error on the OPER_ERR pin, causing HDC 120 to abort. In such a situation, RWC 110 sets a register bit so firmware may determine what happened.

As discussed earlier, FIG. 2F provides additional information about the write data transfer control signals.

Read Data Transfer

Figure 11:
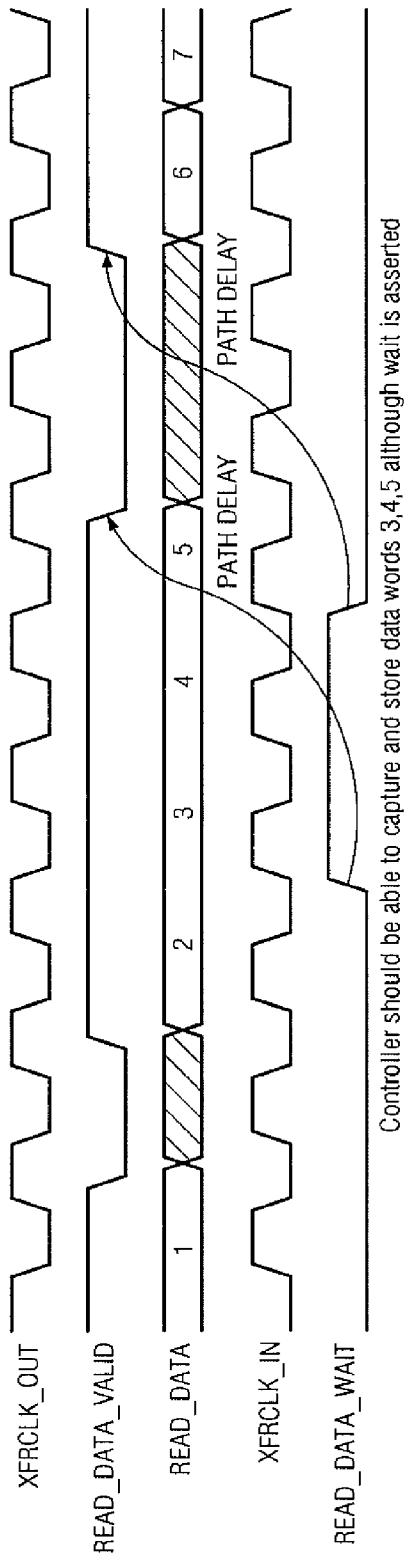
FIG. 11 illustrates a read data transfer operation with an HDC stall, according to one embodiment.
Figure 12:
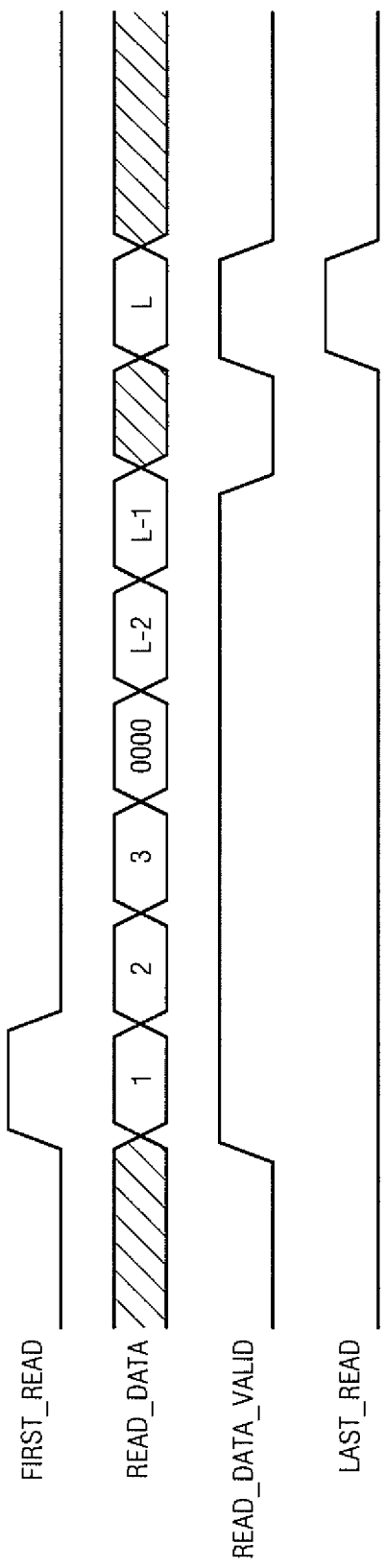
FIG. 12 illustrates a sector read data transfer operation according to one embodiment.

FIG. 11 illustrates a read data transfer operation with an HDC stall, according to one embodiment. Likewise, FIG. 12 illustrates a sector read data transfer operation according to one embodiment. Read mode is entered by de-asserting the WRITE_MODE signal over VLI interface 100. WRITE_MODE remain de-asserted for both media control and data transfers.

During a disk read, RWC 110 is ready to transfer data to HDC 120 an indeterminate amount of time after a sector's RG. At that time, RWC 110 raises READ_DATA_VALID and provides the first symbol of data on READ_DATA. Whenever READ_DATA_VALID is high, RWC 110 produces a new symbol of data.

HDC 120 may stall the data transfer at any time by raising READ_DATA_WAIT. In read data transfer, the same protocol as in write data transfer is followed. RWC 110 transmits data as long as the READ_DATA_WAIT signal it observes (after internal synchronization stage) is de-asserted. When a wait condition occurs, RWC 110 de-asserts READ_DATA_VALID until the wait condition is cleared.

Data transferred to HDC 120 is grouped in sectors; the code words boundaries are determined by the RWC 110 and the HDC 120 is notified with the CW_END signal.

The first symbol of read data transferred in any sector is accompanied by FIRST_READ from RWC 110. FIRST_READ goes high at the same time that READ_DATA_VALID goes high, and goes low after the first symbol transfer occurs.

The last symbol of data in any sector is accompanied by LAST_READ from RWC 110. LAST_READ goes high after the second-to-last symbol is transferred. It goes low after the last symbol is transferred. LAST_READ is one cycle long if the last symbol is transferred right after the second-to-last symbol, but can be extended until the last symbol is actually transferred.

The last symbol of data in any codeword is accompanied by CW_END from RWC 110. CW_END goes high after the second-to-last symbol is transferred. It goes low after the last symbol of the codeword is transferred. CW_END is used also to validate the data information transfer from RWC 110 when DATA_ERR and DATA_INFO are asserted. Thus, HDC 120 knows at the end of each codeword if RWC 110 encountered any issue during the data decoding and correction phases.

The pauses in data flow introduced by RWC 110 are independent of the location of splits on the media. All split information is lost in RWC 110 during decoding.

The amount of data to be transferred per sector over the READ_DATA bus is equal to SECTOR_SIZE. If the SECTOR_SIZE and/or the code word size is not a multiple of 16 bits, then RWC 110 pads the last word of the sector/code word. The READ_DATA bus is left aligned, and padding bits, if any, are placed at the LSBs of the word.

As discussed earlier, FIG. 2G provides additional information about the read data transfer control signals.

FIG. 13 illustrates data error handling operations according to embodiments of the present disclosure. In FIG. 13(a), there is one code word for each sector. In FIG. 13(b), each sector includes four code words. In situations where the sync mark is missed on a segment for a specific sector or where any data or sync warning occurs, RWC 110 continues to send the entire sector to HDC 120, even if the sector includes questionable segment data. When the encoding is off (e.g., special modes), the DATA_ERR and DATA_INFO busses are set to zero.

Data Parity

In both read and write data transfers, the 16 bits of READ/WRITE_DATA are aligned with an extra bit that represents the odd parity of the transmitted 16 bits symbol. This means that the encoded symbol (data+parity) will have even parity. The following examples illustrate this:

WRITE_DATA=H0000 or HAF63 or HFFFF, WRITE_DATA_PARITY=0

WRITE_DATA=H0001 or H20B7 or HFEFF, WRITE_DATA_PARITY=1

WRITE_DATA_PARITY from HDC 120 is used to check for a possible data integrity error right after VLI interface 100 in RWC 110.

READ_DATA_PARITY from RWC 110 is generated and sent aligned with the data to HDC 120 in order to check for a possible data integrity error right after VLI interface 100 in HDC 120.

If a data parity check error occurs, RWC 110 flags it by sending a DATA_INTEGR_ERR signal to HDC 120. This signal stays set until it is cleared by the firmware. RWC 110 continues any actual operation regardless of any parity check failure.

Self Servo Write (SSW) Operation

Self Servo Write mode is entered by setting a register in each of RWC 110 and HDC 120. Both HDC 120 and RWC 110 need to be programmed for SSW operation. In SSW mode, servo data to be written is transferred over the WRITE_DATA bus, following standard write data transfer protocols. SSW data is composed of 16 bit words. It is assumed that data contains no padding.

During SSW operation, if RWC 110 experiences data starvation while still expecting data, it flags an error on the OPER_ERR pin, causing HDC 120 to abort. RWC 110 sets a register bit so firmware may determine what happened. In SSW mode, a channel register bit is used as a SSW enable signal. In SSW mode, the VLI interface is used only for data transfer and the actual timing of the media write operation is determined by RWC 110.

Defect Scan Operation

Defect scan mode is entered by setting a register in each of RWC 110 and HDC 120. Both HDC 120 and RWC 110 need to be programmed for DFS operation. In defect scan mode, defect scan data is transferred over the READ_DATA bus to HDC 120 following a read operation. Defect scan data is composed of 11-bit words, transferred at the XFER_CLK clock rate. Data words on the READ_DATA bus are left-to-right aligned, and RWC 110 adds 0 pad bits to 5 LSB positions.

Each defect scan word contains a compressed version (ORed) of defect scan flags of 16 channel bits, with the exception of the first defect scan word. The first defect scan word contains the compressed defect scan flags related to preamble and sync mark fields.

Channel Faults

In case of a write channel fault, RWC 110 aborts the write operation by lowering PWG and clearing the write buffers. Then, RWC 100 asserts one of the error signals on VLI interface 100. The firmware services this error immediately after detection (reading registers that specify the presence and the nature of the fault), stops processing the current sector, and de-asserts all write controls to RWC 100. HDC 120 enters an initialization stage following this event.

In case of a read channel fault, RWC 110 asserts one of the error lines on VLI interface 100. The nature of the fault can be read by the firmware in the fault registers of RWC 110. If possible, RWC 110 maintains the flow of data to HDC 120 even if the data are corrupted by the occurrence of the error. HDC 120 enters an initialization stage following this event.

Write Abort and Read Abort

HDC 120 can abort a write operation anytime by asserting ABORT_RWC while the WRITE_MODE is asserted to RWC 110. RWC 110 asserts ABORT_DONE after detecting the abort request from HDC 120 and having de-asserted PWG and cleared the write data buffers. ABORT_DONE is de-asserted by the firmware. After this, RWC 110 is ready for a new write operation.

Likewise, HDC 120 can abort a read operation anytime by asserting ABORT_RWC while the WRITE_MODE is de-asserted to RWC 110. RWC 110 asserts ABORT_DONE after detecting the abort request from HDC 120 and having cleared the read data buffers. ABORT_DONE is de-asserted by the firmware. After this, RWC 110 is ready for a new read operation.

Note that various details have been provided above describing specific implementations of a variable latency interface. These details are provided for illustration and explanation of the specific implementations. Various modifications to the specific implementations may be made according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a storage device controller; and
a read/write channel coupled to the storage device controller by a variable latency interface, the variable latency interface comprising:
  a media control component configured for read and write operations, the media control component controlled by a first clock domain; and
  a data transfer component configured for read and write operations, the data transfer component controlled by at least one second clock domain, the first clock domain being independent of the at least one second clock domain;
  wherein a read or write operation in the media control component is offset from a respective read or write operation in the data transfer component by a latency period.

2. The apparatus of claim 1, wherein a length of the latency period is variable.

3. The apparatus of claim 2, wherein the length of the latency period is based on at least one of encoding and decoding of data at the read/write channel.

4. The apparatus of claim 1, wherein an end of the latency period is triggered by a ready gate, the ready gate indicating that the read/write channel is ready for a read gate or a write gate.

5. The apparatus of claim 1, wherein a start of a write operation in the media control component occurs after a start of a respective write operation in the data transfer component, and a time period between the starts is associated with the latency period.

6. The apparatus of claim 1, wherein a start of a read operation in the data transfer component occurs after a start of a respective read operation in the media control component, and a time period between the starts is associated with the latency period.

7. The apparatus of claim 1, wherein the first clock domain and the at least one second clock domain are generated by the read/write channel.

8. The apparatus of claim 1, wherein the length of the latency period is based on at least one of encoding and decoding of data at the read/write channel.

9. A method for managing variable latency in an interface, the interface coupling a read/write channel to a storage device controller, the method comprising:
performing a read operation in a media control component of the interface, the media control component controlled by a first clock domain;
performing a read operation in a data transfer component of the interface, the data transfer component controlled by at least one second clock domain, the first clock domain being independent of the at least one second clock domain;
wherein a start of the read operation in the media control component is offset from a start of the read operation in the data transfer component by a latency period.

10. The method of claim 9, wherein a length of the latency period is variable.

11. The method of claim 10, wherein the length of the latency period is based on at least one of encoding and decoding of data at the read/write channel.

12. The method of claim 9, wherein the start of the read operation in the data transfer component occurs after the start of the read operation in the media control component, and a time period between the starts is associated with the latency period.

13. The method of claim 9, wherein the first clock domain and the at least one second clock domain are generated by the read/write channel.

14. The method of claim 9, wherein an end of the latency period is triggered by a ready gate, the ready gate indicating that the read/write channel is ready for a read gate or a write gate.

15. A method for managing variable latency in an interface, the interface coupling a read/write channel to a storage device controller, the method comprising:
performing a write operation in a media control component of the interface, the media control component controlled by a first clock domain;
performing a write operation in a data transfer component of the interface, the data transfer component controlled by at least one second clock domain, the first clock domain being independent of the at least one second clock domain;
wherein a start of the write operation in the media control component is offset from a start of the write operation in the data transfer component by a latency period.

16. The method of claim 15, wherein a length of the latency period is variable.

17. The method of claim 16, wherein the length of the latency period is based on at least one of encoding and decoding of data at the read/write channel.

18. The method of claim 15, wherein the start of the write operation in the media control component occurs after the start of the write operation in the data transfer component, and a time period between the starts is associated with the latency period.

19. The method of claim 15, wherein the first clock domain and the at least one second clock domain are generated by the read/write channel.

20. The method of claim 15, wherein an end of the latency period is triggered by a ready gate, the ready gate indicating that the read/write channel is ready for a read gate or a write gate.

* * * * *